United States Patent [19]

Ware

[11] E Re. 31,282

[45] Reissued Jun. 21, 1983

[54] SHOT-FEEDING METERING VALVE

[75] Inventor: James R. Ware, Pasadena, Tex.

[73] Assignee: National Petro Chemicals Corporation, New York, N.Y.

[21] Appl. No.: 247,651

[22] Filed: Mar. 26, 1981

Related U.S. Patent Documents

Reissue of:

[64] Patent No.: 4,155,488
Issued: May 22, 1979
Appl. No.: 852,658
Filed: Nov. 18, 1977

[51] Int. Cl.[3] ..... B67D 5/54

[52] U.S. Cl. ..... 222/305; 222/56; 222/636

[58] Field of Search ..... 222/194, 56, 305, 344, 222/370, 636; 251/309

[56] References Cited

U.S. PATENT DOCUMENTS 2,914,223 11/1959 Richter ..... 222/332 X
3,227,312 1/1966 Solvik et al. ..... 222/194

*Primary Examiner*—Allen N. Knowles
*Attorney, Agent, or Firm*—Kenneth D. Tremain

[57] ABSTRACT

A plug valve adapted to meter precise quantities of material passing therethrough in which a cylindrical valve plug is rotatably mounted in a cylindrically shaped aperture in a valve body. First and second sets of radially extending inlet and outlet passageways are connected to the valve body aperture, with each inlet passageway being radially opposite a corresponding outlet passageway. Two orthogonally oriented, nonintersecting valve ports extend through the valve plug perpendicular to its axis of rotation, the ports being closely spaced from each other along the axis and with the diameter of each valve port being approximately one-half the diameter of the passageways such that one valve port connects one set of inlet and outlet passageways while the orthogonally positioned second port simultaneously connects the second set of inlet and outlet passageways. One inlet passageway connects to a source of material to be metered, and fills one of the valve ports with a precise volume of the material, the associated outlet passageway of that set of passageways being normally closed to prevent the egress of material therefrom. Rotation of the valve plug aligns the filled valve port with the second set of passageways so as to allow the quantity of metered material to flow from the valve. As one valve port is being filled with a metered quantity of material, the second valve port is being emptied of material simultaneously therewith.

9 Claims, 6 Drawing Figures

SHOT-FEEDING METERING VALVE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates, in general, to a valve for precisely metering or intermittently feeding precise quantities of material. More particularly, the present invention relates to a metering valve adapted to simultaneously carry out two functions within the valve, namely, a first function consisting of metering a precise quantity of material into one port of the valve, and a second function consisting of dispensing a premeasured quantity of material from a second port in the valve.

2. Discussion of the Prior Art

Metering valves of this type are utilized, amongst other applications, for the intermittent feeding of predetermined quantities or charges of material into a chemical stream at a controlled rate which is determined by the rotational speed of the valve plug. Valves having this general type of construction are known in the art, and usually are of the plug type wherein a single orifice of a predetermined size extends through the valve plug perpendicular to the axis of rotation of the latter. The valve plug is adapted to assume two separate positions, one placing the orifice in communication with a source of material which is to be metered, and the second placing it in a position to feed the previously metered material into a controlled chemical reaction. Valves of this nature have found particular utility in polymerization reactors wherein precise quantities or charges of a metered material, such as a catalyst, must be directed into the chemical reactor, and particularly reactors employed for the polymerization of ethylene into polyethylene. These prior art valves require a 90° rotational displacement between filling and discharge positions, and a rotational movement of 180° for each complete operative cycle.

Solvik et al U.S. Pat. No. 3,227,312 discloses an improvement over that type of plug valve. In particular, Solvik et al disclose a plug valve of the shot injecting or feeding type, which operates twice as fast as the prior type of plug valves, by requiring only a 90° rotation of the valve plug for each operative cycle, in contrast with a 180° valve plug rotation necessary in the earlier prior art valve technology. Thus, in Solvik et al a cylindrical valve plug is mounted for rotation in an aperture provided in a valve body. The valve body has first and second sets of radially extending inlet and outlet passageways, with the two sets being disposed perpendicular relative to each other. Two nonintersecting valve ports extend through the valve plug perpendicular to the plug axis of rotation. The centers of the inlets and outlets of both valve ports are located in the same plane perpendicular to the axis of rotation of the valve plug. The passageways do not intersect because each port passageway is inclined or sloped away from the other, with one passageway being inclined in a first direction along the axis of rotation and the second passageway being inclined in the opposite direction along the axis of rotation. However, although a metering valve of this type is capable of operating at substantially twice the speed of operation of earlier prior art metering plug valves, the manufacture of such a valve is relatively complicated and expensive. The forming of the above-mentioned ports in the valve plug, one of which inclines in a first direction along the axis of rotation and the second of which inclines or slopes in an opposite direction along the valve plug axis of rotation, results in a valve plug configuration which is both difficult and costly to manufacture, thereby rendering such a construction both expensive and uneconomic from a commercial standpoint. Thus, it becomes desirable to provide a metering valve which incorporates the rapid speed of operation inherent in the Solvik et al plug valve design, but which eliminates the necessity of having a valve configuration which is difficult and expensive to manufacture.

SUMMARY OF THE INVENTION

Accordingly, in order to overcome or ameliorate the limitations encountered in the prior art, the present invention contemplates the provision of an improved metering valve, particularly of the shot-feeding type, which has a relatively fast rate of operation, and which is designed so as to be relatively simple and inexpensive to manufacture.

Pursuant to a preferred embodiment of the invention, there is disclosed a metering valve of the plug valve type wherein a circular recess is formed within a valve body about an axis of rotation. At least first and second sets of oppositely disposed radially extending inlet and outlet passageways are formed in the valve body and communicate with the recess. A round or substantially cylindrical valve plug is mounted for rotation in the recess, and has formed therein at least two nointersecting through-extending valve ports aligned perpendicular to its axis of rotation. The valve ports are spaced from each other along the axis of rotation, with each valve port being adapted to respectively connect one set of radially extending inlet and outlet passageways when the valve plug is in a predetermined rotational position. Further, the preferred embodiment discloses a metering valve of the type described wherein the valve ports are linear bores extending along parallel lines through the valve plug. More particularly, the disclosed embodiment discloses a metering plug valve in which the inlet and outlet passageways all have substantially circular cross-sectional shapes and are disposed with their centers in a common plane perpendicular to the valve plug axis of rotation. Additionally, the valve ports are substantially circular in cross-section, and with the diameters of the valve ports being substantially one-half the diameters of the valve passageways. This design allows the valve ports to be linear passageways spaced parallel from each other along the axis of rotation of the valve and still able to connect oppositely disposed radially extending inlet and outlet passageways in each of several positions of the plug valve. Furthermore, the preferred embodiment of the invention also provides for a plug valve wherein hollow cylindrical sleeves or inserts are removably insertable within each of the valve ports, to thereby enable sleeves accommodating different volumes of material within their confines to be selectively positioned within the ports, thereby allowing different quantities or charges of material to be metered through the plug valve by merely changing sleeve sizes.

Accordingly, it is a primary object of the present invention to provide a novel metering valve of the shot-feeding type which meters quantities or charges of a material at a fairly rapid rate, and which is of simple and inexpensive construction.

BRIEF DESCRIPTION OF THE DRAWINGS

The foregoing and other objects and advantages of the novel metering valve constructed pursuant to the teachings of the present invention may be understood more readily by one skilled in the art, having reference to the following detailed description of a preferred embodiment thereof, taken in conjunction with the accompanying drawings; in which.

DETAILED DESCRIPTION OF THE DRAWINGS

Figure 1:
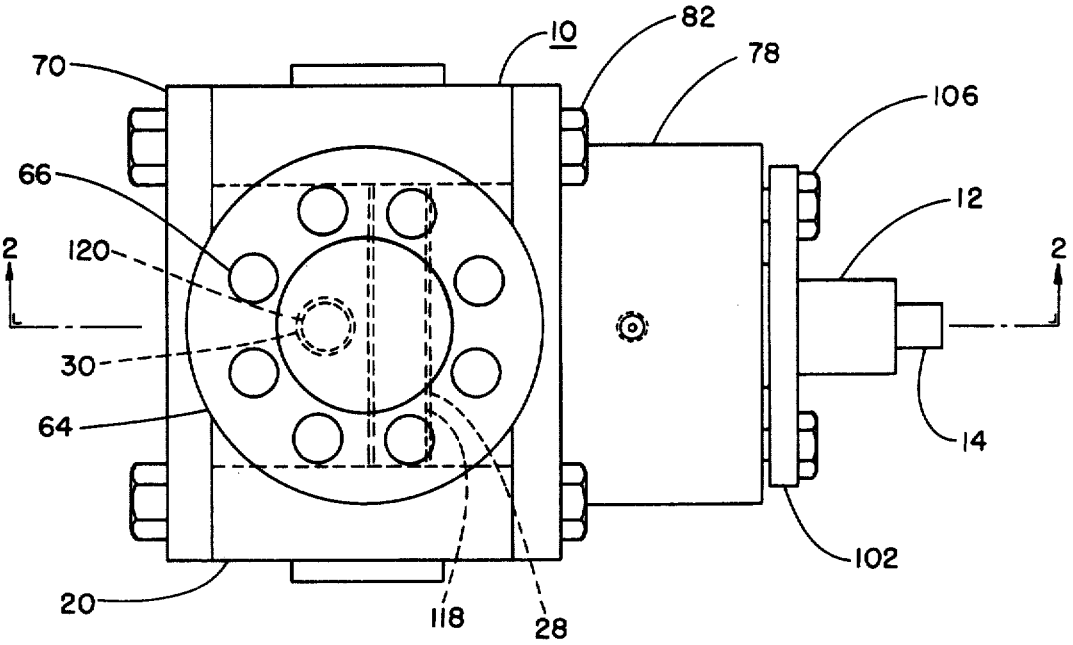
FIG. 1 is a top plane view of one embodiment of a metering valve constructed pursuant to the teachings of the present invention.
Figure 2:
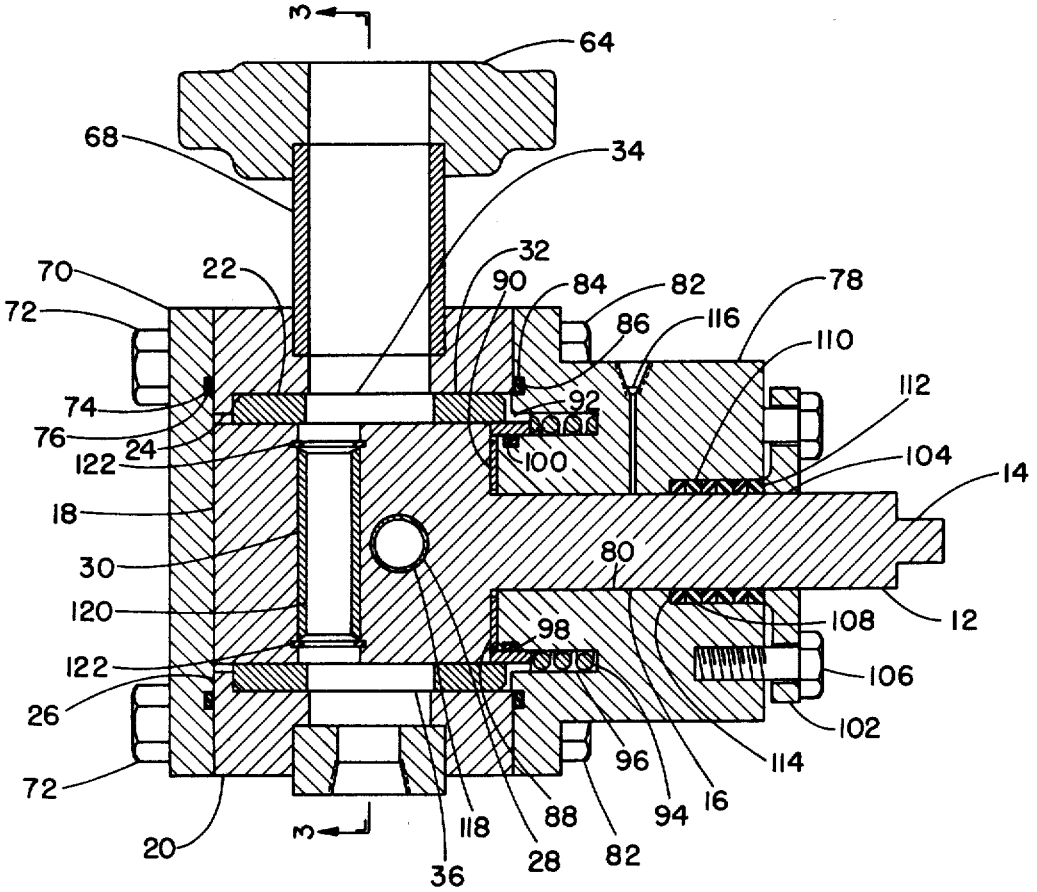
FIG. 2 is an elevational sectional view of the metering valve taken along line 2—2 in FIG. 1.
Figure 3:
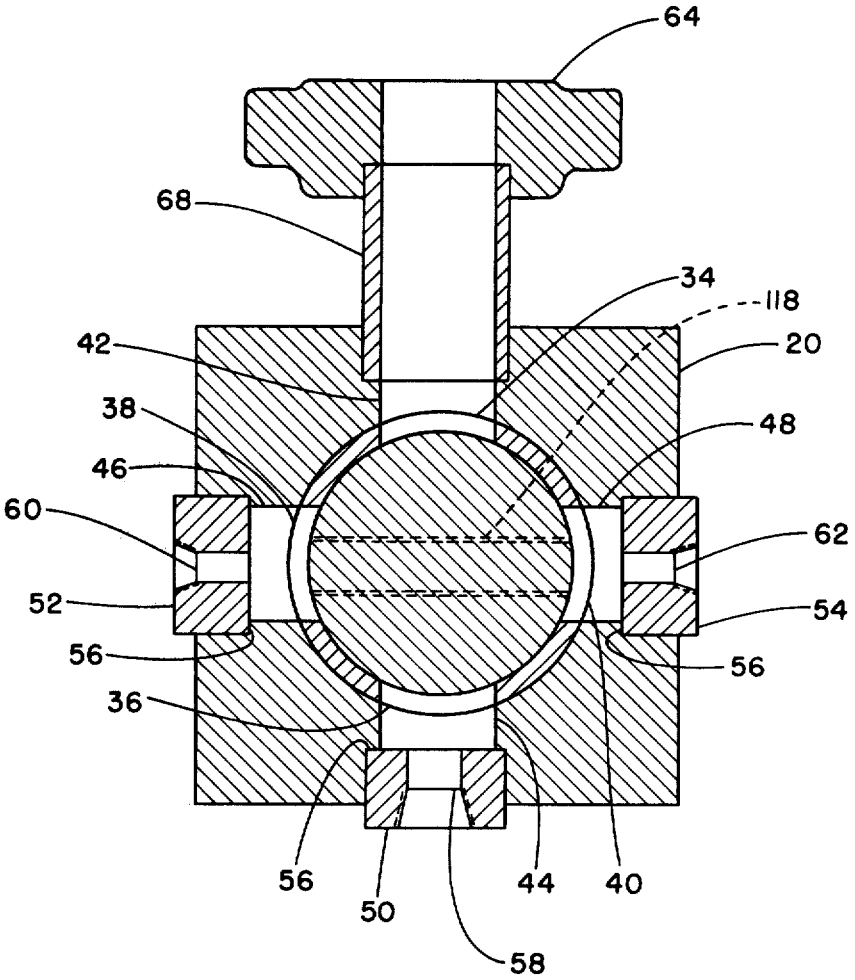
FIG. 3 is an elevational sectional view of the metering valve taken along line 3—3 in FIG. 2.

Referring now in detail to the drawings, in FIG. 1 there is illustrated a top plane view of a metering plug valve 10 constructed pursuant to the teachings of the present invention, and which includes a control shaft 12 having a square-shaped end portion 14 projecting from the valve to enable a valve drive (not shown), usually a pneumatic drive, to rotate the shaft 12 about a central longitudinal axis of rotation. As shown in FIG. 2, shaft 12 includes a relatively narrow cylindrical section 16 which, at the end opposite to end 14, extends into a larger diameter cylindrical valve plug 18 rotatably mounted in a main valve body 20 of the valve 10. The shaft 12 may be formed of steel or other suitable material, and its cylindrical surface may be coated with chrome oxide or some other equivalent wear resistant and durable material. The valve body 20 may be machined from mild steel or other suitable material. The valve body has a first large diameter, cylindrically shaped aperture 22 extending into a second smaller diameter, cylindrically shaped aperture 24, with an annular shoulder 26 or flange being formed at the juncture of the two different diameter apertures. First and second valve ports 28 and 30 in valve plug 18 are closely spaced from each other along the axis of rotation of the shaft 12, with the port pair being centrally located along the length of the valve plug, each port extending across the full width of the valve plug as measured through the axis thereof. Valve port 28 is shown in a horizontal operative position in the drawings, whereas valve port 30 is illustrated in a vertical position, with the valve ports being arranged orthogonal relative to each other. Valve plug 18 is rotatably supported in valve body 20 by a cylindrical liner 32 which encompasses the arcuate wall of the cylindrical valve plug, being interposed between the plug 18 and the cylindrical wall surface of aperture 22, and which extends into axial contact with annular shoulder 26 in the valve body. Liner 32 may, preferably, be constituted of tungsten carbide or some other suitable hard wear-resistant material. As illustrated in FIG. 3, the liner 32 has formed in its upper surface a first circular inlet aperture 34 adapted to communicate with a first circular outlet aperture 36 located directly diametrically therebelow in the bottom surface of the liner, and a second circular inlet aperture 38 adapted to communicate with a second circular outlet aperture 40 disposed on the diametrically opposite side of the liner. These four apertures are, respectively, aligned with the valve body passageways comprising a first circular, radially extending inlet passageway 42 which (as shown) communicates with inlet aperture 34; a first circular, radially extending outlet passageway 44 which communicates with outlet aperture 36; a second circular, radially extending inlet passageway 46 communicating with inlet aperture 38; and a second circular, radially extending outlet passageway 48 communicating with outlet aperture 40.

The diameters of valve ports 28 and 30 are each somewhat slightly less than one-half the diameter of the inlet and outlet apertures and passageways with the arrangement being such that, in the position of the valve shaft shown in the drawings, vertically oriented valve port 30 communicates between inlet passageway 42 and outlet passageway 44, and horizontally oriented valve port 28 extends between inlet passageway 46 and outlet passageway 48. When the shaft 12 is rotated through an angle of 90°, each valve port is correspondingly rotated so as to, respectively, communicate between the opposite sets of inlet and outlet passageways. Thus, in essence, if initially valve port 30 extends between passageways 42 and 44, upon rotation of the valve shaft through 90° it will then extend between passageways 46 and 48, whereas valve port 28 initially extends between passageways 46 and 48 and thereafter, upon rotation of the valve shaft through 90°, extends between passageways 42 and 44. Outlet passageway 44, inlet passageway 46, and outlet passageway 48 may be, respectively, connected to other equipment through the intermediary of coupling blocks 50, 52 and 54, each seated in enlarged diameter portions of, respectively, passageways 44, 46 and 48 and bearing against internally formed annular shoulders 56. Each coupling includes a centrally formed radially extending bore 58, 60 and 62 having its exterior end portion provided with a female pipe thread adapted to be engaged by a complementary male pipe threaded fitting. Each of the coupling blocks may be formed of steel, or similar suitable material, and may be secured to the main valve body 20 by a fillet weld surrounding the exterior of the coupling body where it joins the main body 20 of the valve. The top coupling member 64 is unique because of the particular application for which the disclosed plug valve is utilized, and includes a flanged connection having connecting bolt holes 66 provided therein for bolting the coupling member to another corresponding flanged member of a filling arrangement (not shown). Coupling member 64 is connected to the main body 20 of the valve by a short length of pipe 68 which extends into an enlarged diameter circular aperture in the flange 64. Similarly, in the valve body, pipe 68 extends into a larger diameter bore until it abuts a shoulder formed where the larger diameter bore joins inlet passageway 42. The diameters of the various bores are selected so that the internal diameter of the aperture extending from flange 64 down to inlet aperture 34 is substantially constant.

The valve is substantially square-shaped and includes a generally square-shaped closure plate member 70 which is attached to the valve body 20 by four radially spaced bolts 72 which extend through bores in the closure plate into corresponding interiorly threaded apertures in the valve body. The closure plate is sealed against the valve body by an O-ring 74 which is positioned within an annular groove 76 formed in the closure plate and extending about the aperture 24 in the valve body 20.

The valve body 20 is closed at its opposite surface by a generally square-shaped bonnet 78. An axially extending cylindrically shaped bore 80 is formed in the bonnet which is slightly larger than the diameter of the cylindrical section 16 of the shaft 12 and which accommodates the shaft therein. The bonnet 78 is attached to the valve body 20 by four radially spaced bolts 82 which extend through four bores formed in the bonnet into suitable internally threaded apertures provided in the housing 20, against which they may be tightened. Bonnet 78 includes an annular groove 84, which extends about aperture 22 in the valve body, and accommodates an O-ring 86 to seal the bonnet against the valve body. The face 88 of the valve plug is separated from the bonnet 78 by an annular thrust washer 90, which may be formed of Teflon or some other suitable low-friction material. The shaft member 12 is urged in a rearward direction, to properly position the shaft relative to the housing, by an annular seal ring 92, which extends around a portion of the bonnet 78 and abuts the annular front face 88 of the valve plug. The seal ring is urged against the annular front face 88 of the valve plug by a compressed spring 94 which fits into an annular slot 96 formed in the rear face of the bonnet. An O-ring 98 is positioned in an annular groove 100 formed in the bonnet, and extends about the bonnet in sealing engagement with the seal ring 92.

A gland 102 encompasses shaft 12 and has an axially extending cylindrically shaped bore 104 formed therein to accommodate the passage therethrough of shaft 12. Suitable bolts 106 attach the gland 102 to the bonnet 78. The bonnet includes an increased diameter axially extending internal bore portion 108 extending about the front section or shaft 12 so as to form an annular space therebetween. Packing rings 110 are positioned to fill the annular space and are squeezed between a shoulder formed on the gland 102 and the shaft 12 by a flange 112 formed on the inner face of the gland 102. Tightening of bolts 106 causes the flange 112 to press the packing rings into the annular slot against the shoulder 114 to seal the valve, and particularly to seal the lubricants thereof. A suitable lubricating bore and thread 116 may be provided in the bonnet 78 for attachment of a lubricating fitting (not shown).

One unique aspect of the plug valve disclosed by the present invention is its designed ability to vary the volume metered in the two valve ports 28 and 30 by enabling the insertion therein of removable and replaceable cylindrically shaped hollow sleeves 118 and 120. These sleeves are held in place by snap rings, illustrated at 122 in FIG. 2, which are secured in place in annular groove formed in the valve ports. With this arrangement, there may be supplied a variety of sleeves, each having different internal diameters, so that the volume of material charged to each valve port decreases as the internal diameter of the sleeve decreases, and conversely. The internal diameter of each sleeve may be selected such that the volume of material receivable in each valve port assumes a given measurement, for instance 10 cc, 20 cc, 30 cc, and so forth.

Particular sleeves may be removed from or inserted into the valve ports by removing the bolts 82 holding the bonnet 78 in place, and removing the latter from the valve. Thereafter, the valve plug 18 may be removed from the liner and its surrounding valve, and the snap rings 122 removed to allow withdrawal of the sleeves therein. Subsequently, new measuring sleeves are inserted therein, and replacement effected of the snap rings.

In some applications of the invention, the bottom coupling block 50 may be connected with a purge or sample valve or, alternatively, block 50 may be plugged. When it is desired to remove a sample of the material being metered, such material drops from the block 50 through a sample valve, which also may be of the plug type, and which may be manually operated. Alternatively, the sample plug valve may be coupled to automatic actuating means providing for the intermittent operation of the purge valve and removal of material therefrom.

Although one embodiment of a shot-feeder valve has been described in detail, it will be apparent to one having ordinary skill in the art that many alternative embodiments are within the teachings of the present invention. For instance, although the disclosed embodiment shows a plug valve having two sets of inlet and outlet passageways and a valve plug with two orthogonally disposed valve ports therein, it is apparent that a valve may be designed with three or more radially spaced sets of inlet and outlet passageways and a valve plug with three or more symmetrically disposed valve ports therein. In such a valve, the diameter of each of the valve ports would be approximately $\frac{1}{3}$, $\frac{1}{4}$, etc., the diameter of the inlet and outlet passageways. Furthermore, although the disclosed embodiment of the plug valve shows the valve plug as being cylindrical in shape, in alternative constructions the valve plug may assume other shapes such as, for example, a truncated conical shape.

Figure 4:
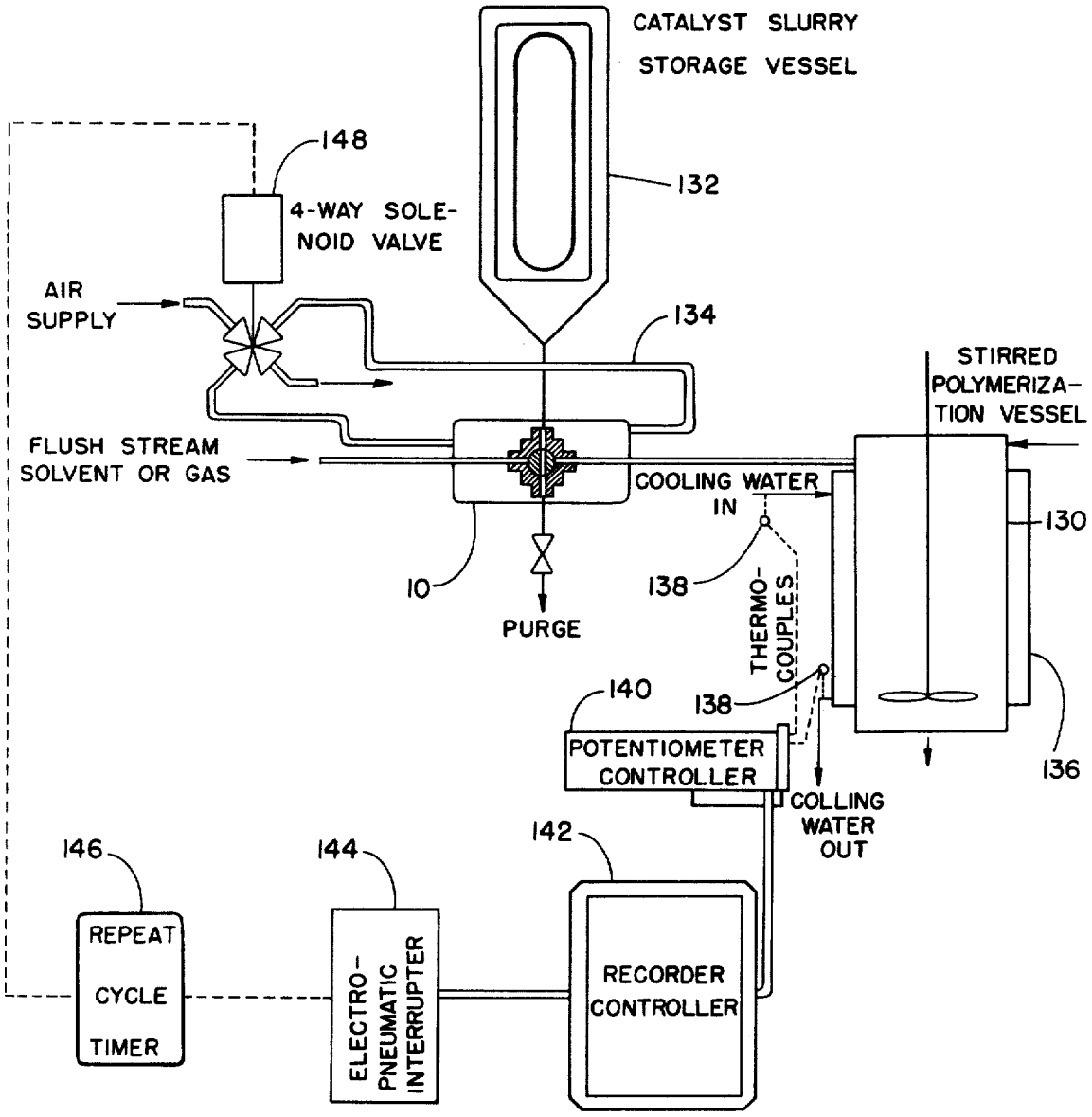
FIG. 4 is a generally diagrammatic view of the metering valve of the present invention utilized in a system wherein the valve meters the flow of a catalyst into a polymerization reactor, and in which the rate of flow of catalyst to the reactor is automatically controlled in accordance with the reaction rate of the reactor.

FIG. 4 of the drawings illustrates one application of the metering valve of the present invention wherein a polymerization catalyst is being fed into a reactor 130 from a reservoir 132 containing a catalyst slurry. Each 90° rotational operating cycle of the valve plug of valve 10 introduces a given quantity of catalyst into the reactor. The catalyst storage tank or reservoir 132 is padded with a nonreactive hydrocarbon reaction medium to prevent introduction of gases into the reactor. A pneumatic system 134 is employed to rotate the shaft 12 of the plug valve. The polymerization reaction is exothermic, and the reactor 130 is provided with a water cooling jacket 136 to cool the reactor. This arrangement allows for measurement in the change in temperature of the water passing through the heat exchanger water jacket, and the measurement to be utilized for automatically controlling the cycle time of the catalyst feeder to maintain the desired reaction rate. In the process control circuit illustrated in FIG. 4, thermocouples 138 are placed at the inlet and outlet connections of water coolant circulating through the water jacket heat exchanger 136. The outputs of the thermocouples are directed to a potentiometer controller 140 which detects temperature increases or decreases from a given level. The output of potentiometer controller 140 is conveyed pneumatically to a recorder controller 142, which records the output, and is then conveyed to an electropneumatic interrupter 144. The interrupter 144 converts the pneumatic signal to an electrical signal which is conducted to a repeat cycle timer circuit 146 and thence to a four-way solenoid controlled valve 148 which controls the fluid pressure into the pneumatic valve actuating mechanism, as illustrated schematically. In accordance with the system disclosed schematically herein, depending upon the reaction rate within the reactor, the cycle time of the catalyst feeder is increased or decreased, as required, to maintain a desired chemical reaction rate in the reactor.

Figure 5:
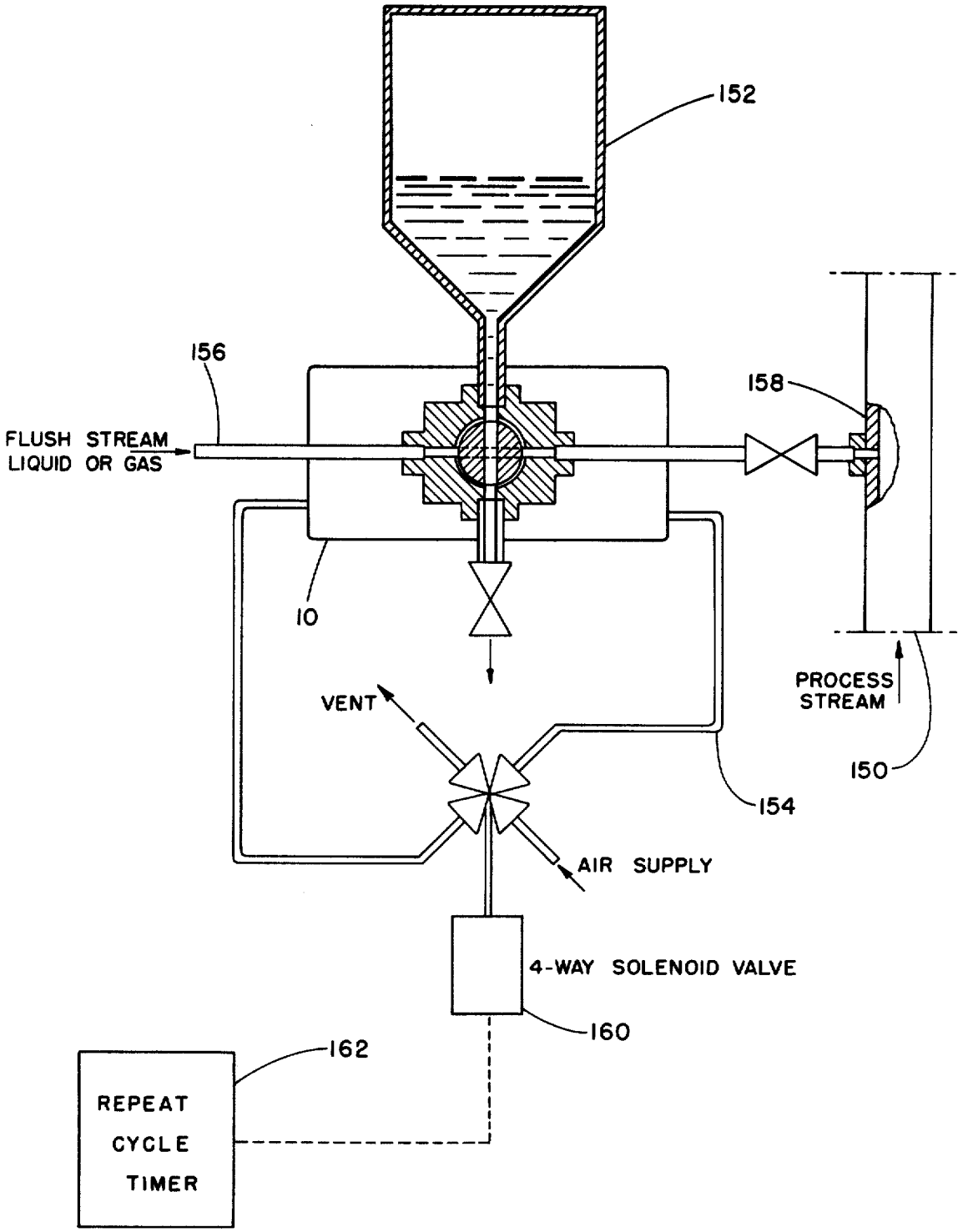
FIG. 5 is a diagrammatic view of a system in which the metering valve of the present invention is utilized to feed a material to a process stream, and wherein a manually set timer or an electrical control circuit is employed to control the rate of flow of the metered material.

FIG. 5 of the drawings illustrates a further system wherein the plug valve of the present invention may be utilized, and wherein a material, either powdered or liquid, is introduced into a process stream 150. The introduced material may be a catalyst, an inhibitor, a moderator, or any other material intended to control a specific reaction in the process stream or to improve the chemical or physical properties of the final product. As shown, an additive storage tank 152 is provided for supplying a suitable material to the valve 10, and pneumatic means 154 are provided for rotating the shaft 12 of the valve. Flushing is accomplished by a liquid or gas introduced at 156, and metered material is delivered to a suitable conduit or the like 158 through which the process stream flows. A four-way solenoid valve 160, provided for controlling the pneumatic metering valve actuation, is controlled by electrical signals received from a repeat cycle timer 162. The output signals of this circuit may be of a fixed duration, capable of being adjusted manually, or a control circuit may be utilized to vary the rate of flow of the material in accordance with the rate of flow of the process stream.

Figure 6:
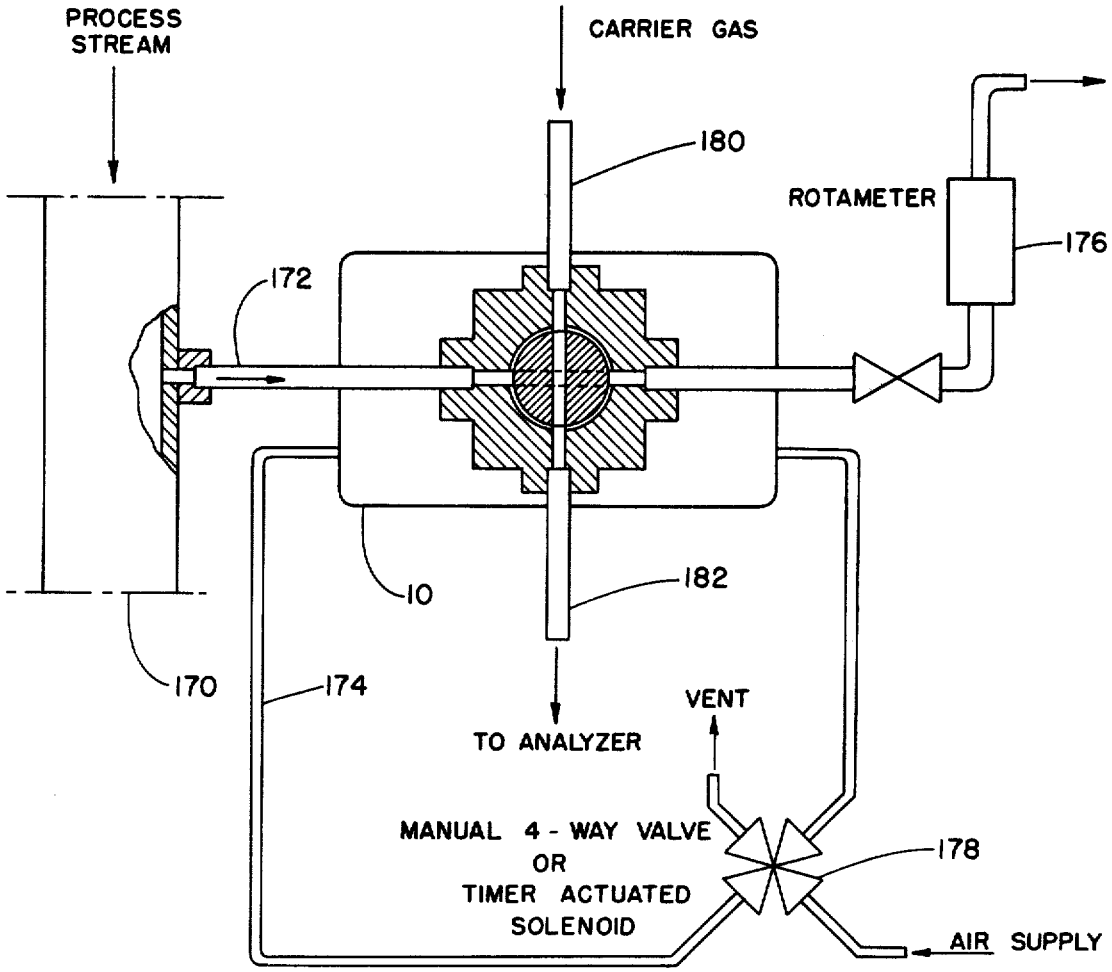
FIG. 6 is a diagrammatic view of a system utilizing the inventive metering valve in which a sample from a process stream is intermittently removed from the stream at fixed time intervals.

FIG. 6 shows a system in which a sample is intermittently removed for analysis from a process of purge stream. A process stream through a conduit 170 has a portion of its flow directed through a second conduit 172 to the plug valve 10, which is actuated by a pneumatic actuating mechanism 174. The output of plug valve 10 is directed to a rotameter 176. The pneumatic valve actuating mechanism includes a manually operated, or timer operated, solenoid four-way valve 178. A suitable inert carrier gas, such as helium, is supplied at 180 from a suitable source, and is employed to transport samples intermittently and automatically to analyzing apparatus (not shown) through the conduit 182.

Several embodiments of a metering valve and several systems in which a metering valve may be utilized have been disclosed. However, it should be understood that the teachings of the present invention will suggest other embodiments and applications to those skilled in the art, and therefore the invention is not considered to be limited to only that which is shown in the drawings and described in the specification.

What is claimed is:

1. A metering plug valve of the shot-feeding type comprising:

a. a valve body having an annular recess formed therein and located symmetrically about an axis of rotation, at least first and second sets of oppositely disposed inlet and outlet passageways extending through said valve body and communicating with said recess; and b. a generally cylindrical valve plug rotatably mounted in said recess for rotational movement about said axis of rotation, at least two nonintersecting linear valve [ports] *bores* extending through said valve plug along straight lines in parallel spaced planes, said valve [ports] *bores* being spaced from each other along said axis of rotation and passing through said axis of rotation, each said valve [port] *bores* respectively connecting an inlet passageway with an outlet passageway upon said valve plug being in a predetermined rotational position in said valve body.

2. A plug valve as claimed in claim 1, each said inlet and outlet passageways and said valve [ports] *bores* having a substantially circular cross-sectional configuration, the diameters of said inlet and outlet passageways being substantially twice as large as the diameters of said valve [ports] *bores*.

3. A plug valve as claimed in claim 2, comprising hollow cylindrical sleeves removably mounted within said valve ports, said sleeves having predetermined internal diameters for containing preselected volumes of material therein, said sleeves adapted to be selectively replaced by sleeves having different internal diameters in said ports, so that the valve meters different volumes of material responsive to selection of said sleeves.

4. A plug valve as claimed in claim 3, said inlet and outlet passageways being symmetrically located about said axis of rotation with their central axes being located in a common plane extending transverse to said axis of rotation.

5. A plug valve as claimed in claim 4, said valve [ports] *bores* intersecting said axis of rotation at substantially right angles.

6. A plug as claimed in claim 1, each of said inlet and outlet passageways and said valve [ports] *bores* having a substantially circular cross-sectional configuration, the diameters of said inlet and outlet passageways being substantially twice as large as the diameters of said valve [ports] *bores*.

7. A plug valve as claimed in claim 1, comprising hollow inserts interchangeably mounted within said valve [ports] *bores*, whereby inserts holding different volumes of material are adapted to be selectively mounted within said ports so that the valve, upon changing of the inserts, meters different volumes of material.

8. A plug valve as claimed in claim 1, said inlet and outlet passageways being symmetrically located about said axis of rotation and having their axes lying in a common plane extending transverse to said axis of rotation.

9. A plug valve as claimed in claim 1, said valve [ports] *bores* intersecting said axis of rotation at substantially right angles.

* * * * *